United States Patent [19]

Niles et al.

[11] 4,293,102

[45] Oct. 6, 1981

[54] REEL WEIGHT ASSEMBLY

[75] Inventors: Gerald J. Niles, St. Paul; Norman C. Ritter, Mounds View, both of Minn.

[73] Assignee: Minnesota Mining and Manufacturing Company, St. Paul, Minn.

[21] Appl. No.: 159,290

[22] Filed: Jun. 13, 1980

[51] Int. Cl.³ .............................................. B65H 75/18
[52] U.S. Cl. .................................................. 242/71.8
[58] Field of Search ...................... 242/71.8, 115, 116, 242/118.4

[56] References Cited

U.S. PATENT DOCUMENTS

| Re. 26,556 | 3/1969 | Hulfgren | 242/71.8 |
| 1,926,836 | 9/1933 | Corlett | 242/118.4 |
| 2,427,193 | 9/1947 | Canfield | 242/118.4 |

FOREIGN PATENT DOCUMENTS 79331 3/1961 France ............................... 242/71.8

Primary Examiner—Edward J. McCarthy
Attorney, Agent, or Firm—Cruzan Alexander; Donald M. Sell; William L. Huebsch

[57] ABSTRACT

A weight assembly adapted for use with a polymeric reel comprising a hub portion having a plurality of sockets opening through one side surface of the reel to approximately match the moment of inertia of the polymeric reel with that of a similar metal reel. The weight assembly has a plurality of weights spaced around and projecting from a ring, which weights are shaped and spaced so as to enter the sockets, and means are provided for releasably attaching the weight assembly to the reel with the weights in the sockets and the ring adjacent one side surface of the reel.

6 Claims, 3 Drawing Figures

U.S. Patent     Oct. 6, 1981     4,293,102
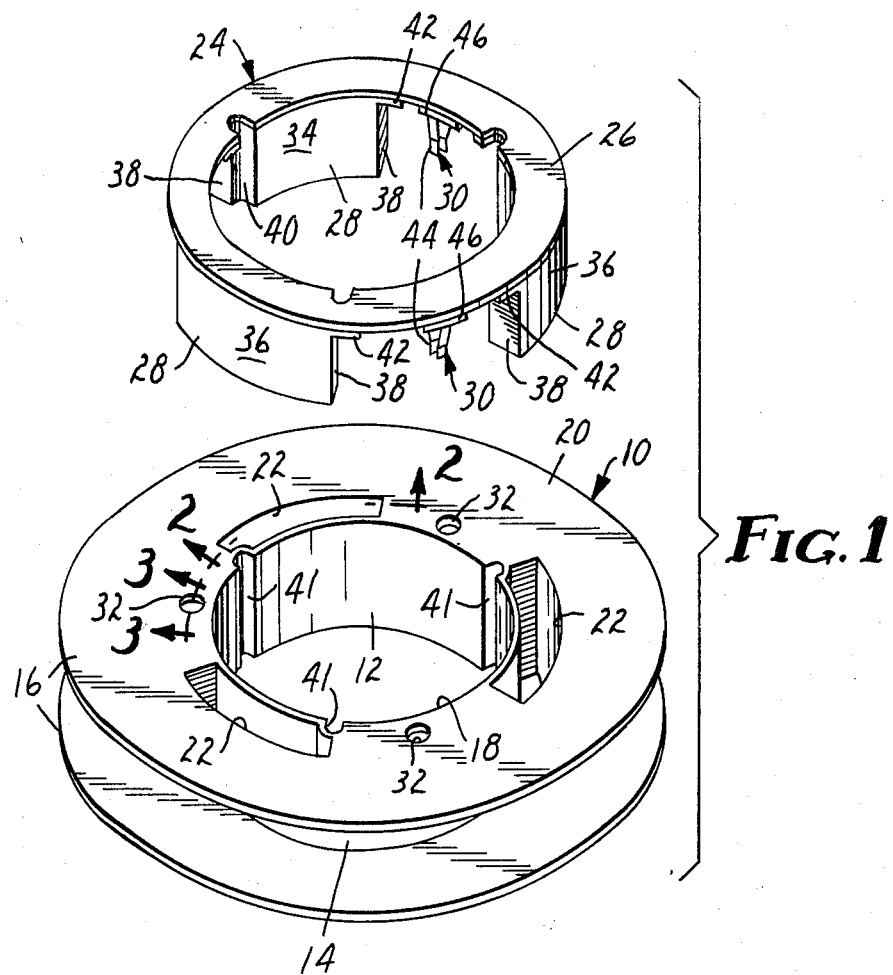
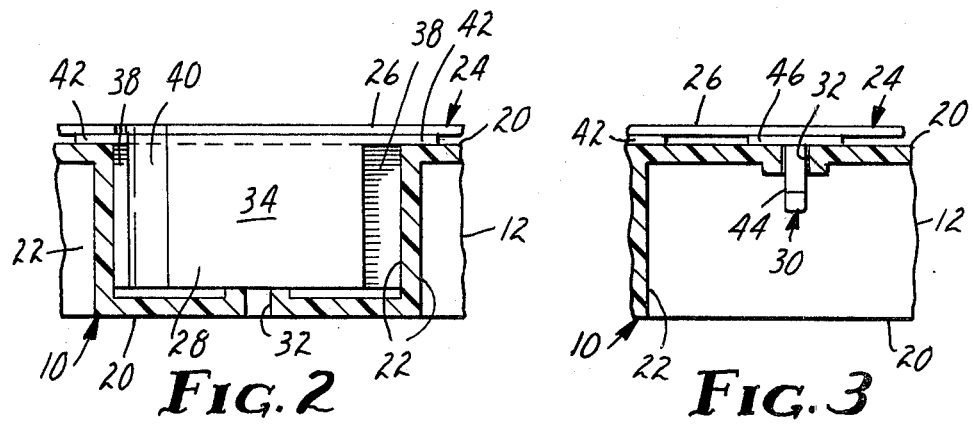

REEL WEIGHT ASSEMBLY

TECHNICAL FIELD

The present invention is related to weights adapted to be releasably inserted in sockets formed in plastic videotape reels to approximately match the moment of inertia of the plastic reel to that of a metal reel.

Background Art

The one-inch video broadcast machines presently in use in the television industry are designed to use metal reels for supplying and taking up magnetic tape for the machine. Light weight, usually smaller, and relatively inexpensive polymeric reels have recently come into use for storing and shipping one-inch videotape. While polymeric reels can be used on such video broadcast machines, they do not have the same moment of inertia as the metal reels for which the machine reel drives were designed, and thus can cause operational problems (particularly when such reels have little tape wound about them), such as instability of servo-systems in the reel drives when the reels are being slowed down which causes improper movement of the tape across the tape head. Also, when such a polymeric reel is used as a takeup reel in combination with a metal tape supply reel and the machine is stopped, the plastic reel will stop more quickly than the supply reel, thereby causing a loop of tape to form between the reels that can damage the tape when the machine is re-started; and when such a polymeric reels is used as a supply reel in combination with a metal takeup reel, the plastic reel will again stop more quickly than the metal reel when the machine is stopped, causing the tape between the reels to be stretched and potentially damaged. Thus it has been found desirable to match the moment of inertia of polymeric reels with that of metal reels when polymeric reels are used on video broadcast machines.

One recently used method for providing a moment of inertia for a polymeric reel that approximates the moment of inertia for metal reels has been to insert weights into sockets formed around a hub portion of the polymeric reel and opening through a side surface of the reel. Known weights used for this purpose have comprised a heavy metal core encased in a resilient elastic material (e.g., rubber) and adapted to frictionally engage the walls defining the sockets in the reel. To use such weights, an operator presses each of three weights individually into one of three sockets around the hub portion of the reel, and after use must similarly pull each of the weights from within the sockets via a projecting handle portion on each weight.

While such weights can generally match the moment of inertia of the polymeric reel to that of the metal reels, their use is more inconvenient and time consuming than may be desired.

DESCRIPTION OF THE INVENTION

According to the present invention, there is provided a weight assembly adapted for use to generally match the moment of inertia of a polymeric reel with that of a metal reel, which weight assembly is a one-piece unit that may be more quickly and conventionally inserted in and removed from the polymeric reel than the individual weights described above.

According to the present invention, there is provided a weight assembly for use on polymeric reels of the type comprising a hub portion having side surfaces, a through central opening, and a plurality of sockets opening through one side surface of the reel and spaced around the through opening. The weight assembly comprises a support plate in the form of an annular ring having a central opening larger than the through opening of the reel to afford engagement of the reel by the video broadcast machine, and a plurality of weights spaced around and projecting axially from the ring in the same direction, which weights are shaped and spaced along the ring so as to enter the sockets in the reel when the weight assembly is brought coaxially adjacent the side surface of the reel. Means are also provided for releasably attaching the weight assembly to the reel with the weights in the sockets and the ring portion coaxially adjacent the side surface of the reel to prevent the weight assembly from flying off the reel during operation of the video broadcast machine.

Preferably, the means for attaching comprise spring clips projecting axially of the ring from the same side of the ring from which the weights project, which spring clips are adapted to releasably engage walls defining orifices in the reel. With this arrangement, the weight assembly may be pressed into position with the weights in the sockets and the spring clips engaging the reel, and may then be easily released from the reel by impacting the side of the reel against an operator's hand with the ring portion adjacent his hand so that the spring clips release from the reel and the weight assembly may be separated therefrom.

BRIEF DESCRIPTION OF DRAWING

The present invention will be further described with reference to the accompanying drawing wherein like numbers refer to like parts in the several views and wherein:

FIG. 1 is an exploded perspective view of a reel weight assembly and polymeric reel according to the present invention; and FIGS. 2 and 3 are enlarged sectional views respectively taken approximately along lines 2-2 and 3-3 of FIG. 1 with the reel weight assembly engaged with the reel.

DETAILED DESCRIPTION

Referring now to the drawing, there is illustrated a combination according to the present invention including a polymeric reel 10 having a hub portion 12 including walls defining a cylindrical outer surface 14 about which videotape may be wound between spaced reel flanges 16, a through central opening 18 between opposite side surfaces 20 of the reel 10, and three sockets 22 opening through each side surface of the reel 20 and spaced around the through opening 18. Also included is a weight assembly 24 adapted to releasably engage the reel 10 and provide a moment of inertia for the polymeric reel 10 that approximates the moment of inertia of a similar aluminum metal reel.

The weight assembly 24 comprises a support plate in the form of an annular ring portion or ring 26 having an opening slightly larger than the through central opening 18 of the reel 10 to facilitate engagement of the reel by a video broadcast machine; and a plurality of weight portions or weights 28 equally spaced around and projecting axially from one side of the ring 26, which weights 28 are spaced along the ring 26 and are shaped to enter the sockets 22 in the hub portion 12 of the reel 10 when the weight assembly 24 is brought coaxially adjacent either side surface 20 of the reel 10. Means for releasably attaching the weight assembly 24 to the reel 10 with the weights 28 in the sockets 22 and the ring 26 positioned coaxially adjacent one side surface 20 of the reel are provided by three spring clips 30 projecting axially of the ring 26 from the same side of the ring 26 from which the weights 28 project. The spring clips 30 are spaced halfway between the weights 28 and the walls of the reel 10 have cylindrical surfaces defining apertures 32 in the reel 10, which aperture-defining walls are adapted to be releasably engaged by the spring clips 30 (FIG. 3) to hold the weight assembly 24 on the reel 10.

Preferably, the annular ring 26 and weights 28 of the weight assembly 24 are integrally cast of metal (e.g. steel) with each weight 28 conforming closely in shape to the inner surface of the walls defining the sockets 22 in the reel 10 by having cylindrically concave inner surfaces 34, cylindrically convex outer surfaces 36, axially-aligned planar end surfaces 38, and a radially-extending groove 40 at a corresponding end of each of the weights 28. The groove 40 in each weight 28 is adapted to receive an arcuate wall having an outer surface defining a portion of one of the sockets 22, and an inner surface defining one of three axially-extending channels 41 in the reel 10 opening into its central opening 18 and adapted to receive a portion of reel drive means on a video machine (not shown). Additionally, the weights include tabs 42 projecting along the adjacent surface of the annular ring 26, which tabs 42 are adapted to engage the side surface 20 of the reel 10 adjacent the ring 26 and space the ring 26 therefrom by a small distance (e.g., 0.25 cm or 0.1 inch) to facilitate engagement of the reel 10 by the drive means on certain types of video broadcast machines.

Preferably, the spring clips 30 for releasably attaching the weight assembly 24 to the reel 10 are generally of the type sold by Eaton Corporation of Cleveland, Ohio, and designated "Tinnerman" Trademark, one-piece, self-sufficient clips, Part No. C 4925-022. Such clips 30 comprise opposed outwardly-bowed spring members 44 integrally formed with and projecting from a common base plate 46 adapted to be fastened as by spot-welding to the ring 26. The spring members 40 are adapted to enter the apertures 32 and to be pressed together by and pass partially past the walls defining the apertures 32 so that the bowed portions of the members 40 will spread and engage the walls at the end of the apertures 32 opposite the surface 20 to releasably retain the weight assembly 24 adjacent the reel 10 until sufficient force is applied to the weight assembly 24 to cam the members 40 together so that they can again pass through the apertures 32. Preferably, the wall of the reel is thickened axially of the reel 10 around each aperture 32 (FIG. 3) to facilitate secure engagement of the spring clips 30 with the reel.

To use the polymeric reel 10 and weight assembly 24 according to the present invention, a user simply inserts the three weights 28 on the assembly 24 into the sockets 22 opening through one side surface 20 of the reel 10 and presses the weight assembly 24 against the reel 10 so that the spring clips 30 enter and securely engage the walls of the reel 10 defining the apertures 32. He may then mount (or may have already mounted) the reel 10 on a video broadcast machine via the attachment means on that machine, whereupon the moment of inertia of the reel 10 will be generally matched to the moment of inertia of metal reels which may also be used on the machine and for which the machine was designed so that tape will be properly moved through the machine between the reels. Subsequently, when the operator removes the reel 10 from the machine, he may easily remove the weight assembly 24 from the reel 10 by lightly impacting the side of the reel 10 on which the weight assembly 24 is engaged against his open hand, whereupon the spring clips 30 will release from the walls defining the apertures 32 and the weight assembly 24 will fall into the palm of his hand to be carried away.

While in the illustrated example the means for releasably attaching the weight assembly 24 to the reel 10 comprises spring clips 30 between the weights 28 adapted to engage walls defining an aperture 32 in the reel 10, it will be appreciated by those skilled in the art that many other attachment means may be utilized. Examples include twist-lock engagement devices mounted on the ring 26 and engageable with the reel, which engagement devices are adapted to be operated by the fingers or tools to more securely attach the weight assembly to the side of the reel should that be desired, or various types of friction or releasable latching mechanisms mounted on or about the weights and adapted to engage walls of the reel defining or intersecting the sockets in the reel. Thus the scope of the present invention should not be limited by the structure of the preferred embodiment disclosed, but only by the breadth of the dependent claims.

We claim:

1. A weight assembly adapted for use with a polymeric reel comprising a hub portion having opposite side surfaces, a through central opening between said side surfaces, and a plurality of sockets opening through one side surface of said reel and spaced around said through opening, said weight assembly comprising:

a support plate having a central opening; a plurality of weights spaced around and projecting axially from one side of said support plate, said weights being shaped and spaced along said support plate so as to enter the sockets in a said reel hub portion when said weight assembly is brought coaxially adjacent one side surface of a said reel; and means for releasably attaching said weight assembly to a said reel with said weights in said sockets and said support plate adjacent said one side surface.

2. A weight assembly according to claim 1 comprising three spaced weights.

3. A weight assembly according to claim 1 wherein said support plate is in an annular ring and said means for releasably attaching comprises spring clips projecting axially of said ring from the same side of said ring that said weights project, said spring clips being spaced between said weights and being adapted to releasably engage walls defining apertures in said reel.

4. In combination, a polymeric reel comprising a hub portion having opposite side surfaces, a through central opening between said side surfaces, and a plurality of sockets opening through one side surface of said reel and spaced around said through opening; and a weight assembly comprising a support plate having a central opening larger than the through opening of said reel; a plurality of weights spaced around and projecting axially from one side of said support plate, said weights being shaped and spaced along said support plate so as to enter the sockets in said reel hub portion when said weight assembly is brought coaxially adjacent the side surface of a said reel; and means for releasably attaching said weight assembly to said reel with said weights in said sockets and said support plate adjacent said side surface.

5. A combination according to claim 4 wherein said weight assembly comprises three spaced weights.

6. A combination according to claim 4 wherein said support plate is an annular ring and said means for releasably attaching comprise spring clips projecting axially of said ring from the same side of said ring that said weights project, said spring clips being spaced between said weights, and walls defining apertures in said reel adapted to be releasably engaged by said spring clips.

* * * * *